(12) United States Patent
Bristow

(10) Patent No.: US 10,609,926 B2
(45) Date of Patent: Apr. 7, 2020

(54) SYNERGISTIC HERBICIDAL COMPOSITION

(71) Applicant: JIANGSU ROTAM CHEMISTRY CO., LTD, Jiangsu (CN)

(72) Inventor: James Timothy Bristow, Chai Wan (HK)

(73) Assignee: JIANGSU ROTAM CHEMISTRY CO., LTD, Jiangsu (CN)

(*) Notice: Subject to any disclaimer, the term of this patent is extended or adjusted under 35 U.S.C. 154(b) by 18 days.

(21) Appl. No.: 15/777,643

(22) PCT Filed: Feb. 3, 2017

(86) PCT No.: PCT/CN2017/072842
§ 371 (c)(1),
(2) Date: May 18, 2018

(87) PCT Pub. No.: WO2017/129142
PCT Pub. Date: Aug. 3, 2017

(65) Prior Publication Data
US 2018/0368400 A1    Dec. 27, 2018

(30) Foreign Application Priority Data
Jan. 29, 2016 (AU) ................................ 2016200564

(51) Int. Cl.
*A01N 25/32* (2006.01)
*A01N 43/80* (2006.01)
*A01N 43/70* (2006.01)

(52) U.S. Cl.
CPC ............. *A01N 25/32* (2013.01); *A01N 43/70* (2013.01); *A01N 43/80* (2013.01)

(58) Field of Classification Search
None
See application file for complete search history.

(56) References Cited

U.S. PATENT DOCUMENTS

| 2005/0256004 A1 | 11/2005 | Takahashi et al. |
| 2011/0065579 A1 | 3/2011 | Sievernich et al. |
| 2016/0345582 A1 | 12/2016 | Refsell |

FOREIGN PATENT DOCUMENTS

| AU | 2016200564 B1 | 12/2016 |
| CN | 103181391 A1 | 7/2013 |
| CN | 103734148 A | 4/2014 |
| CN | 106259362 A | 1/2017 |
| WO | 2006097322 A2 | 9/2006 |

OTHER PUBLICATIONS

First Office Action regarding Australian Patent Application No. 2016200564 dated Sep. 30, 2016.
N. Soltani, et al.; Department of Plan Agriculture, University of Guelph Ridgetown Campus, Ridgetown, Ontario, Canada N0P 2C0; Received Sep. 14, 2009, accepted Nov. 13, 2009; Long-spine sandbur [*Cenchrus longispinus* (Hack. in Kneuck.) Fernald] control in corn.
International Search Report and Written Opinion regarding Application No. PCT/CN2017/072842 dated May 9, 2017.

*Primary Examiner* — Alton N Pryor
(74) *Attorney, Agent, or Firm* — Dickinson Wright PLLC

(57) ABSTRACT

A synergistic herbicidal composition comprising Pyroxasulfone, Topramezone and Atrazine as the active components, wherein the weight ratio of Pyroxasulfone, Topramezone and Atrazine ranges from 1 to 10:1 to 10:1 to 100, is provided. Use of the synergistic herbicidal composition for controlling the growth of undesirable plants is also provided. A method of controlling the growth of undesirable plants, which comprises applying the active components Pyroxasulfone, Topramezone and Atrazine of the synergistic herbicidal composition to the undesirable plants or their growing locus or separately is also provided. A method of reducing or preventing harm caused by Pyroxasulfone when applied to plants, seeds or other reproductive parts of useful crops is also provided.

12 Claims, No Drawings

SYNERGISTIC HERBICIDAL COMPOSITION

CROSS REFERENCE TO RELATED APPLICATIONS

This application is a 371 national phase entry of PCT/CN2017/072842, filed 3 Feb. 2017, which claims priority benefit of AU Patent Application No. AU2016200564 filed Jan. 29, 2016, the contents of which are incorporated herein by reference in their entirety.

FIELD

The present invention relates to a synergistic herbicidal composition and a method of controlling the growth of undesirable plants.

BACKGROUND

In crop farming industry, controlling weeds which restrain the growth of crops and reduce yield and protecting crops are very important. In order to reduce the loss caused by weeds during crop cultivation, such as poor growth or reclined crop yield, some herbicidal active components have been developed to control weeds effectively while remain safe to crops. By far, there are a large number of developed herbicides have been registered and applied to control some weeds growing in crops. The herbicides which are applied to control weeds in specific crop cultivation should possess an effective level of herbicidal activity and broad-spectrum of weed control, as well as be safe enough to environment and crops. However, not all of them can fully comply with aforesaid requirements.

The traditional method of enhancing herbicidal activity and broadening herbicidal spectrum of existing herbicides is to mix two or more herbicidal substances with different herbicidal activity. When the efficacy of a mixture with two or more ingredients exceeds the anticipated efficacy of each ingredient, it is called "synergistic effects"; when the efficacy of a mixture with two or more ingredients is beneath the anticipated efficacy of each ingredient, it is called "antagonistic effects"; when the efficacy of a mixture with two or more ingredients is equal to the anticipated efficacy of each ingredient, it is called "additive effects". However, as a result of the difference in herbicidal efficacy, absorption rate, transmission and metabolism, the herbicidal activity of most mixtures is lower than that of each ingredient applied separately. Only under certain circumstances, the herbicidal mixture exhibits synergistic effects when two or more substances with herbicidal activity are mixed together.

Pyroxasulfone, with chemical name as 3-[5-(difluoromethoxy)-1-methyl-3-(trifluoromethyl) pyrazol-4-ylmethyl sulfonyl]-4,5-dihydro-5,5-dimthyl-1,2-oxazole, is represented by the following chemical structure:

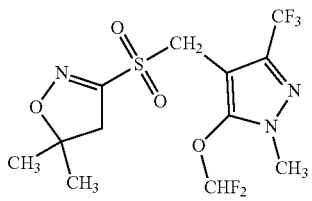 [SMILES: Cn1nc(C(F)(F)F)c(CS(=O)(=O)C2=NOC(C)(C)C2)c1OC(F)F]

Pyroxasulfone was described in EP1364946 and US20050256004. Although Pyroxasulfone is a highly effective pre-emergence herbicide, its activity becomes low after the emergence. When Pyroxasulfone is applied to certain dicotyledonous crops, such as cotton, sunflower, soybean, and *brassica* crops, such as canola and oil rape and some gramineous crops, such as rice, wheat, rye and barley, the crops may suffer from unacceptable level of harms.

It is known that by applying the mixture of some different herbicides having specific effects can enhance the activity of herbicidal ingredients which is more effective than simply combining them. This activity enhancement is also called synergistic effect or synergistic activity and thus it can decrease the application rate of herbicidal active compounds used to control harmful plants.

Topramezone, with chemical name as [3-(4,5-dihydro-3-isoxazolyl)-2-methyl-4-(methylsulfonyl)phenyl](5-hydroxy-1-methyl-1H-pyrazol-4-yl)methanone is represented by the following chemical structure:

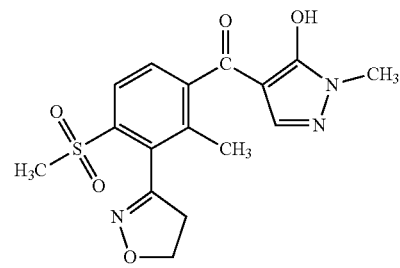

Topramezone is a new type of herbicides in inhibiting hydroxyphenylpyruvate dioxygenase enzyme. Topramezone and its preparation have been disclosed in WO98/31681 and WO99/58509. Its mechanism involves inhibiting 4-hydroxyphenylpyruvate dioxygenase (HPPD) enzyme in the biosynthesis of plastoquinone, so that indirectly affecting the synthesis of carotenoid pigment and disrupting the synthesis and function of chloroplast in the presence of light, resulting in severe chlorosis and etiolation, dead tissue and plant death at 14 days after the treatment. It is absorbed through foliage and roots of the sensitive weeds by bidirectional (upward and downward) transmission inside the plants which stop growing soon. After 2-5 days of application, the weeds above the ground show symptom of etiolating and poisoning, particularly at the areas of growing point, blades and leaf vein. These etiolated tissues gradually die and the whole plants die within 10-15 days according to weather condition. Topramezone is safe to corn, as different from sensitive weeds, the herbicide resistance of corn is achieved by lower sensitive to target enzyme, less uptake and transmission and faster metabolism. Topramezone is able to effectively eliminate annual gramineous weeds and sedge weeds, such as Common crabgrass, Barnyardgrass, *Setaria viridis, Brachiaria eruciformis, Eleusine indica*, Wild Panicgrass, fountaingrass, *Cenchrus, Cyperus difformis, Cyperus iria, Amaranth*, knotweed, bindweed, thistle, pigweed, cocklebur, *Solanum nigrum, Abutilon, Datura stramonium, Galeopsis, Matricaria recutita, Ambrosia, Sinapis arvensis, Daucus carota, Acanthospermum, Acanthospermum hispidum, Mercurialis Annua, Desmodium tortuosum, Emilia sonchifolia, Galinsoga parviflora, Nicandra physalodes* (Linn.) Gaertner, Common Dayflower, *Lindernia crustacea* (L.) *F. muell* and *Mazus pumilus*. Topramezone is also capable of controlling those broadleaf weeds that appear resistance to ALS and triazine herbicide effectively and steadily.

Atrazine, with chemical name as 2-chloro-4-ethylamino-6-isopropylamino-1,3,5-triazine, is represented by following structure:

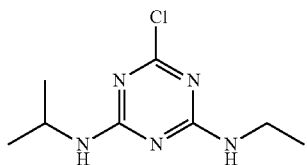

Atrazine is a systemic selective herbicide used at pre- and post-emergence stage. Atrazine is absorbed most readily by plant roots, rarely by stem and leaf and it is able to control weed by soil sealing and at early post-emergence, effective in controlling annual broadleaf weeds and gramineous weeds. Atrazine is prone to be moved to deep layer of soil by rainfall, therefore it is effective to certain weeds root deeply, but it is easy to produce toxic substance. As persistence of Atrazine in soil is very long, it is not recommended to increase its application rate randomly, especially in the arid areas, in case to cause harms to post-harvest crops.

In the current, the herbicide spectrum is limited because of regulation to ensure the safety of crops. Application of a single herbicide is unable to completely and effectively control the weeds in the field of crops, on the other side, over-dosed herbicide or unevenly application is likely to produce unacceptable toxic to current crops or post-harvest crops. Pyroxasulfone is a highly effective herbicide used before emergence, but becomes less active after the emergence stage. Besides, the compatibility of Pyroxasulfone with some dicotyledonous crops, such as cotton, sunflower and beans, *brassica* crops, such as canola and oil rape, and certain gramineous crops, such as rice, wheat, rye and barley, is not ideal, as it not only damages the target plants, but also harms crops at unacceptable level. In principle, the damage to crops can be eased by decreasing the application rate, while its efficacy of control target plants also reduced accordingly.

SUMMARY

It is surprising to find that, the synergistic herbicidal composition of the present invention has achieved synergistic effect in controlling undesirable plant, which significantly reduces the amount of active components to control weeds, as well as mitigates or prevents the harms on plants, seeds or other reproductive parts of useful crops after been treated by Pyroxasulfone. The herbicidal activity of the composition of Pyroxasulfone, Topramezone and Atrazine is greater than the sum of individual compound.

In one aspect, the present invention provides a synergistic herbicidal composition, which is not only able to enhance the efficacy of weed control, but also improve the safety of crops, reduce the herbicide application cost and extend the applicable scope. The synergistic herbicidal composition comprises the active components Pyroxasulfone, Topramezone and Atrazine, wherein the weight ratio of Pyroxasulfone, Topramezone and Atrazine ranges from 1 to 10:1 to 10:1 to 100, preferably from 1 to 10:1 to 10:1 to 50, and more preferably from 1 to 10:1 to 10:1 to 25.

The synergistic herbicidal composition may comprise active components Pyroxasulfone, Topramezone, Atrazine, surfactant and/or filler.

The active components Pyroxasulfone, Topramezone and Atrazine are present in the said synergistic herbicidal composition in an amount of 5%-90%, 10%-80% or 20%-60%.

The synergistic herbicidal composition may be provides as a formulation selected from a Wettable Powder (WP), an Emulsifiable Concentrate (EC), a Suspension Concentrate (SC), a Capsule Suspension (CS), a Micro-emulsion (ME), an Oil-in-water Emulsion (EW), Suspo-emulsion (SE), Water Dispersible Granules (WDG), an Aqueous Solution (AS), a mixed formulation of capsule suspension and suspension concentrate (ZC) and an Ultra-low Volume Liquid (ULV).

The present invention provides a use of the synergistic herbicidal composition in controlling undesirable plants.

More particularly, the use of the synergistic herbicidal composition in controlling the growth of undesirable plants, including broadleaf weeds, sedges and gramineous weeds.

The present invention also relates to use of the synergistic herbicidal composition in controlling the growth of undesirable plants within useful crops, especially useful crops that are resistant to said synergistic herbicidal composition such as wheat, barley, rye, triticale, hard wheat, rice, corn, sugar cane, *sorghum*, soy bean, peas, beans, lentils, peanut, sun flower, sugar beet, potato, cotton, oil rape, canola, leaf mustard, cabbage, turnip, turf, grapes, peach, almond, walnut, olive, cherry, plum, apricot, citrus and pistachio.

In a further aspect, the present invention provides a method of controlling the growth of undesirable plants, comprising applying a herbicidal effective amount of the synergistic herbicidal composition of the present invention to the undesirable plants or their locus of growth (i) before germination of the undesirable plant (pre-emergence); (ii) after germination of the undesirable plant (post-emergence); or (iii) (i) and (ii).

In the method of controlling the growth of undesirable plants, the active components Pyroxasulfone, Topramezone and Atrazine of the synergistic herbicidal composition of the present invention may be applied to the undesirable plants or their locus of growth jointly or separately.

Further, the method to control the growth of undesirable plants may include the application of the synergistic herbicidal composition of the present invention in the presence of the plants, seeds or other reproductive parts of useful crops.

A method to reduce or prevent the harms from Pyroxasulfone when it's treated on the plants, seeds or other reproductive parts of useful crops, including the application of the synergistic herbicidal composition of present invention to treat the plants, seeds or other reproductive parts of the useful crops.

The efficacy of the synergistic herbicidal composition of present invention is more effective than each active ingredient when they are applied separately and the present invention is characterized by delaying the weeds to form drug-resistance, having wider herbicide spectrum, long period of effect and capable of controlling annual gramineous weeds, broadleaf weeds and sedge weeds in the field, as well as being safe to the useful crops and the post-harvest crops.

DETAILED DESCRIPTION OF EXAMPLE EMBODIMENTS

The synergistic efficacy is able to reduce the application rate of single herbicide, increase its efficacy at the same application rate, control the variety that is never been protected before, control the varieties having tolerance or resistance to single or several herbicides, prolong the application period and/or reduce the times of a single application. It provides the user a weed control system that is more economical and ecological.

A synergistic herbicidal composition comprising active components Pyroxasulfone, Topramezone and Atrazine, wherein the weight ratio of Pyroxasulfone, Topramezone and Atrazine ranges from 1 to 10:1 to 10:1 to 100, preferably from 1 to 10:1 to 10:1 to 50, more preferable from 1 to 10:1 to 10:1 to 25.

The synergistic herbicidal composition of present invention is able to synergize the activity of active components Pyroxasulfone, Topramezone and Atrazine in an unprecedented manner, which exceeds the combined activities when each active component, Pyroxasulfone, Topramezone and Atrazine, is applied separately.

The present invention also provides a synergistic herbicidal composition, comprising active components Pyroxasulfone, Topramezone and Atrazine, and filler and/or surfactants.

If use water as filler, other secondary solvent can be added, such as organic solvent. The main suitable liquid solvents are selected from aromatic compound, including xylene, toluene or alkyl naphthalene; chlorinated aromatic hydrocarbons and chlorinated aliphatic hydrocarbons, such as chlorobenzene, vinyl chloride or dichloromethane; aliphatic hydrocarbons, for example cyclohexane or paraffin, such as mineral oil fraction, mineral oil and plant oil; alcohols, such as butanol or ethylene glycol and its ethers and esters; ketones, such as acetone, methyl ethyl ketone, methyl isobutyl ketone or cyclohexanone; strong polar solvents, such as dimethylformamide and dimethyl sulfoxide, and water.

If the filler is solid, the suitable carrier are selected from ammonium salt; grinded nature minerals, such as kaolin, clay, talc, chalk, quartz, attapulgite, montmorillonite or diatomite; grinded synthetic mineral, such as highly dispersed silica, alumina and silicate; grinded and graded natural minerals, such as calcite, marble, pumice, sepiolite and dolomite; inorganic and organic synthesized particles; organic materials (for example saw dust, coconut shell and corn).

The suitable surfactants are selected from nonionic and anionic emulsifier, for example polyethoxylated fatty acid ester, polyethoxylated fatty alcohol ether, such as alkylaryl polyethyleneglycol ether, alkyl sulfonate, alkyl sulfate, aryl sulfonate and protein hydrolysate; the suitable dispersing agents are selected from sulfite lignin and methylcellulose.

The suitable colorants can be selected from inorganic pigment, such as ironoxide, titania and prussian blue; and organic pigment, such as alizarin colorant, azo colorant and metal phthalocyanine colorant.

The suitable tackifier can be selected from carboxymethyl cellulose; natural and synthetic polymer in the form of powder, granules or latex, such as arabic gum, polyvinyl alcohol and polyvinyl acetate; and natural phospholipid, such as cephalin and lecithin, and synthetic lipid. Other additives might be mineral oil and plant oil.

The suitable micronutrients can be selected from iron salt, manganese salt, boron salt, copper salt, cobalt salt, molybdenum salt and zinc salt.

The active components Pyroxasulfone, Topramezone and Atrazine are present in aforesaid synergistic herbicidal composition in an amount of from 5%-90%, preferably from 10%-80%, more preferably from 20%-60%.

The synergistic herbicidal composition of present invention is particularly advantageous as the said active components Pyroxasulfone, Topramezone and Atrazine have been added in an optimum proportion. Moreover, the filler and/or surfactants in the formulation can be adjusted with each other.

The synergistic herbicidal composition of the present invention can be prepared in any traditional formulation. The examples of foliar application formula of premix composition include:

GR: a granule
WP: a wettable powder
WG: a water-dispersible granule
SG: a water-soluble granule
SL: a water-soluble concentrate
EC: an emulstifiable concentrate
EW: an emulsion, oil-in-water
ME: a micro-emulsion
SC: a suspension concentrate
CS: a microencapsulated suspension
OD: an oil-based suspension concentrate
SE: an aqueous suspo-emulsion
FS: a flowable concentrate for seed treatment
ULV: an ultra-low volume liquid In the present invention, it is prepared to choose Wettable Powder (WP), Emulsifiable Concentrate (EC), Suspension Concentrate (SC), Micro-capsule (MC), Micro-emulsion (ME), Oil-in-water Emulsion (EW), Aqueous Suspo-emulsion (SE), Water-dispersible Granule (WG), Water-soluble Granule (SG), Aqueous Solution (AS), Microencapsulated Suspension (CS) and Ultra-low Volume Liquid (ULV). All of above formulations are conventional in the art and their preparation methods are well known to those skilled the art.

The formulations which are suitable for tank-mixed composition include solution, diluted emulsion, suspension or their mixture and powder. Normally, the tank-mixed composition refers to a premix composition which comprises different pesticides and one or more further optional adjuvant after dilution by solvent (e.g. water)

The synergistic herbicidal composition can also be mixed with other known active compounds, such as herbicides, fungicides, insecticides, acaricides, nematicides, safeners, bird repellents, plant nutrients and soil structure modifiers.

Preferably, the synergistic herbicidal composition of present invention still can comprise other herbicides known in the art. The other known herbicides or plant growth regulators suitable to be combined with the active compounds of the present invention are for example the following active compounds (which refers to the compounds that are named according to ISO or chemical or code names), as well as include the applicable forms thereof, such as acid, salt, ester and isomers, such as stereoisomer and optical isomer, for example acetochlor, acibenzolar, acibenzolar-S-methyl, acifluorfen, acifluorfen-sodium, aclonifen, alachlor, allidochlor, alloxydim, alloxydim-sodium, ametryn, amicarbazone, amidosulfuron, aminocyclopyrachlor, aminopyralid, amitrole, ammonium sulfamate, ancymidol, anilofos, asulam, azafenidin, azimsulfuron, aziprotryn, beflubutamid, benazolin, benazolin-ethyl, bencarbazone, benfluralin, benfuresate, bensulide, bentazone, benzfendizone, benzobicyclon, benzofenap, benzofluor, benzoylprop, bicyclopyrone, bifenox, bilanafos, bilanafos-sodium, bispyribac, bispyribac-sodium, bromacil, bromobutide, bromofenoxim, bromoxynil, bromuron, buminafos, busoxinone, butachlor, butafenacil, butamifos, butenachlor, butralin, butroxydim, butylate, cafenstrole, carbetamide, carfentrazone, carfentrazone-ethyl, chlomethoxyfen, chloramben, chlorazifop, chlorazifop-butyl, chlorbromuron, chlorbufam, chlorfenac, chlorfenac-sodium, chlorfenprop, chlorflurenol, chlorflurenol-methy, chloridazon, chlorimuron, chlorimuron-ethyl, chlormequat chloride, chlornitrofen, chlorophthalim, chlorthal-dimethyl, chlorotoluron, chlorsulfuron, cinidon, cinidon-ethyl, cinmethylin, cinosulfuron, clethodim, clodinafop, clodinafop-propargyl, clofencet, clomazone, clomeprop, cloprop, clopyralid, cloransulam, cloransulam-methyl, cumyluron, cyanamide, cyanazine, cyclanilide, cycloate, cyclosulfamuron, cycloxydim, cycluron, cyhalofop, cyhalofop-butyl, cyperquat, cyprazine, cyprazole, 2,4-D, 2,4-DB, daimuron/dymron, dalapon, daminozide, dazomet, n-decanol, desmedipham, desmetryn, detosyl-pyrazolate (DTP), diallate, dichlobenil, 2,4-dichlorprop, 2,4-dichlorprop-P, diclofop, diclofop-methyl, diclofop-P-methyl, diclosulam, diethatyl, diethatyl-ethyl, difenoxuron, difenzoquat, diflufenican, diflufenzopyr, diflufenzopyr-sodium, dikegulac-sodium, dimefuron, dimepiperate, dimethachlor, dimethametryn, dimethenamid, dimethenamid-P, dimethipin, dimetrasulfuron, dinitramine, dinoseb, dinoterb, diphenamid, dipropetryn, diquat, diquat dibromide, dithiopyr, diuron, eglinazine-ethyl, endothal, esprocarb, ethalfluralin, ethametsulfuron, ethametsulfuron-methyl, ethephon, ethidimuron, ethiozin, ethofumesate, ethoxyfen, ethoxyfen-ethyl, ethoxysulfuron, etobenzanid, F-5331 (N-[2-chloro-4-fluoro-5-[4-(3-fluoropropyl)-4,5-dihydro-5-oxo-1H-tetrazol-1-yl]phenyl]ethylsulfonamide), F-7967 (3-[7-chloro-5-fluoro-2-(trifluoromethyl)-1H-benzoimidazol-4-yl]-1-methyl-6-(trifluoromethyl)pyrimidine-2,4(1H,3H)-dione, 2,4,5-fenoprop, fenoxaprop, fenoxaprop-P, fenoxaprop-ethyl, fenoxaprop-P-ethyl, fentrazamide, fenuron, flamprop-M-isopropyl, flamprop-M-methyl, flazasulfuron, florasulam, fluazifop, fluazifop-P, fluazifop-butyl, fluazifop-P-butyl, fluazolate, flucarbazone, flucarbazone-sodium, flucetosulfuron, fluchloralin, flufenacet(thiafluamide), flufenpyr, flufenpyr-ethyl, flumetralin, flumetsulam, flumiclorac, flumiclorac-pentyl, flumioxazin, flumipropyn, fluometuron, fluorodifen, fluoroglycofen, fluoroglycofen-ethyl, flupoxam, flupropacil, flupropanate, flupyrsulfuron, flupyrsulfuron-methyl-sodium, flurenol, flurenol-butyl, fluridone, flurochloridone, fluroxypyr, fluroxypyr-meptyl, flurprimidol, flurtamone, fluthiacet, fluthiacet-methyl, fluthiamide, fomesafen, foramsulfuron, forchlorfenuron, fosamine, furyloxyfen, gibberellic acid, glufosinate, glufosinate-ammonium, glufosinate-P, glufosinate-P-ammonium, glufosinate-P-sodium, glyphosate, glyphosate-isopropylammonium, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P-methyl, hexazinone, HW-02 (1-(dimethoxyphosphoryl)ethyl (2,4-dichlorophenoxy)acetate), imazamethabenz, imazamethabenz-methyl, imazamox, imazamox-ammonium, imazapic, imazapyr, imazapyr-isopropylammonium, imazaquin, imazaquin-ammonium, imazethapyr, imazethapyr-ammonium, imazosulfuron, inabenfide, indanofan, indaziflam, indole acetic acid (IAA), 4-indol-3-yl butyric acid (IBA), iodosulfuron, iodosulfuron-methyl-sodium, ioxynil, ipfencarbazone, isocarbamid, isopropalin, isoproturon, isouron, isoxaben, isoxachlortole, isoxaflutole, isoxapyrifop, KUH-043 (3-({[5-(difluoromethyl)-1-methyl-3-(trifluoromethyl)-1H-pyrazol-4-yl]methyl}sulfonyl)-5,5-dimethyl-4,5-dihydro-1,2-oxazole), karbutilate, ketospiradox, lactofen, lenacil, linuron, maleic hydrazide, 2-methyl-4-chlorophenoxyacetic acid (MCPA), 2-methyl-4-chlorophenoxybutyric acid (MCPB), methyl 2-methyl-4-chlorophenoxybutyrate (MCPB-methyl), ethyl 2-methyl-4-chlorophenoxybutyrate (MCPB-ethyl), Z-[(4-chloro-o-phenyl)oxy]propionic acid (mecoprop), Z-[(4-chloro-o-phenyl)oxy]propionic acid sodium (mecoprop-sodium), mecoprop-butotyl, mecoprop-P-butotyl, P-Z-[(4-chloro-o-phenyl)oxy]propionic acid dimethyl ammonium (mecoprop-P-dimethylammonium), P-Z-[(4-chloro-o-phenyl)oxy]propionic acid ethylhexyl ester (mecoprop-P-2-ethylhexyl), P-Z-[(4-chloro-o-phenyl)oxy] propionic acid potassium, mefluidide, mepiquat-chloride, mesosulfuron, mesosulfuron-methyl, methabenzthiazuron, metam, metamifop, metamitron, metazachlor, metazasulfuron, methazole, methiopyrsulfuron, methiozolin, methoxyphenone, methyldymron, 1-methylcyclopropene, methyl isothiocyanate, metobenzuron, metobromuron, metolchlor, S-metolachlor, metosulam, metoxuron, metsulfuron, molinate, monalide, monocarbamide dihydrogensulfate, monolinuron, monosulfuron, monosulfuron ester, monuron, MT128 (6-chloro-N-[(2E)-3-chloropropy-2-ene-1-yl]-5-methyl-N-phenylpyridazine-3-amine), naproanilide, napropamide, naptalam, neburon, nicosulfuron, nipyraclofen, nitralin, nitrofen, nitrophenol sodium (mixture of isomers), nitrofluorfen, nonanoic acid, norflurazon, orbencarb, orthosulfamuron, oryzalin, oxadiargyl, oxadiazon, oxasulfuron, oxaziclomefone, oxyfluorfen, paclobutrazol, paraquat, paraquat dichloride, pelargonic acid, nonanoic acid, pendimethalin, pendralin, penoxsulam, pentanochlor, pentoxazone, perfluidone, pethoxamid, phenisopham, phenmedipham, phenmedipham-ethyl, picloram, picolinafen, pinoxaden, piperophos, pirifenop, pirifenop-butyl, pretilachlor, primisulfuron, primisulfuron-methyl, probenazole, profluazo, procyazine, prodiamine, prifluraline, profoxydim, prohexadione, prohexadione-calcium, prohydrojasmone, prometon, propachlor, propanil, propaquizafop, propazine, propham, propisochlor, propoxycarbazone, propoxycarbazone-sodium, propyrisulfuron, propyzamide, prosulfalin, prosulfocarb, prosulfuron, prynachlor, pyraclonil, pyraflufen, pyraflufen-ethyl, pyrasulfotole, pyrazolynate, pyrazolate, pyrazosulfuron, pyrazosulfuron-ethyl, pyrazoxyfen, pyribambenz, pyribambenz-isopropyl, pyribambenz-propyl, pyributicarb, pyridate, pyriftalid, pyriminobac, pyriminobac-methyl, pyrimi sulfan, pyrithiobac, pyrithiobac-sodium, pyroxsulam, quinchlorac, quinmerac, quinoclamine, quizalofop, quizalofop-ethyl, quizalofop-P, quizalofop-P-ethyl, quizalofop-P-tefuryl, rimsulfuron, saflufenacil, secbumeton, sethoxydim, siduron, simazine, simetryn, sulcotrione, sulfallate, CDEC, sulfentrazone, sulfometuron, sulfometuron-methyl, sulfosate(glyphosate-trimesium), sulfosulfuron, SYN-523, tebutam, tebuthiuron, tecnazene, tefuryltrione, tembotrione, tepraloxydim, terbacil, terbucarb, terbuchlor, terbumeton, terbuthylazine, terbutryn, thenylchlor, thiafluamide, thiazafluron, thiazopyr, thidiazimin, thidiazuron, thiencarbazone, thiencarbazone-methyl, bensulfuron-methyl, thiobencarb, tiocarbazil, tralkoxydim, triallate, triasulfuron, triaziflam, triazofenamide, tribenuron-methyl, trichloroacetic acid (TCA), triclopyr, tridiphane, trietazine, trifloxysulfuron, trifloxysulfuron-sodium, trifluralin, triflusulfuron, triflusulfuron-methyl, trimeturon, trinexapac, trinexapac-ethyl, tritosulfuron, tsitodef, uniconazole, uniconazole-P, vernolate and other compounds.

The synergistic herbicidal composition of the present invention may also comprise one or more safeners. Safener refers to an organic compound which can lead to better compatibility among crops when applied under certain condition with specifically effective herbicides jointly. Safener usually plays the role as antidote or antagonist in the crops in order to reduce or even prevent harms from crops.

The application of above safener at antidotally effective amount is able to reduce the phytotoxicity and side effect of herbicides, such as those used on economically important crops or fruit plantation (plantation crops). The aforesaid economically important crops include cereals (wheat, barley, rye, oat, corn, rice, millet), sugar beet, sunflower, sugarcane, oil rape, cotton and soybeans.

Following are the compounds suitable to be used as safeners (including possible stereoisomer and ester or salt commonly used for agriculture):benoxacor, cloquintocet(-mexyl), cyometrinil, cloquintocet, cyometrinil, cyprosulfamide, dichlormid, dicyclonon, o-phenyl phosphorothionate o, o-dietholate, fenchlorazole(-ethyl), fenclorim, flurazole, fluxofenim, furilazole, mefenpyr, isoxadifen(-ethyl), mefenpyr(-diethyl), mephenate, naphthalic anhydride, oxabetrinil), 2,2,5-trimethyl-3-(dichloroacetyl)-1,3-oxazolidine, 4-(dichloroacetyl)-1-oxa-4-aza-spiro[4,5]decane and agriculturally acceptable salt and their agriculturally acceptable derivatives when they have carboxyl group. The preferable safeners used in the synergistic herbicidal composition of present invention can be selected from isoxadifen(-ethyl), benoxacor, cloquintocet, cyprosulfamide, dichlormid, fenchlorazole(-ethyl), fenclorim, fluxofenim, furilazole, mefenpyr, naphthalic anhydride, 2,2,5-trimethyl-3-(dichloroacetyl)-1,3-oxazolidine and 4-(dichloroacetyl)-1-oxa-4-aza-spiro[4,5]decane.

The weight ratio between the synergistic herbicidal composition of present invention and safener will vary widely according to the application rate of herbicides and the efficacy of said safeners, such as ranges from 90000:1 to 1:5000, preferably from 7000:1 to 1:1600, in particular from 3000:1 to 1:500. The safener can be prepared with active components Pyroxasulfone, Topramezone and Atrazine in the form of finished formulation or provided and applied as tank mixture with said herbicidal composition.

The present invention has provided a use of a synergistic herbicidal composition in controlling the growth of undesirable plants.

More particularly, the use of a synergistic herbicidal composition in controlling the growth of undesirable plants, including broadleaf weeds, sedge weeds and gramineous weeds.

The synergistic herbicidal composition of present invention has good herbicidal activity particularly effective to a wide spectrum of economically important undesirable plants, either monocotyledonous weeds or dicotyledonous weeds, such as broadleaf weeds, sedge weeds or gramineous weeds, including those tolerant to herbicides such as glyphosate, glufosinate, atrazine and imidazolidinone and to compounds having herbicidal activity such as sulfonylurea. In the typical embodiments, they have described some monocotyledonous weeds and dicotyledonous weeds that can be controlled by the synergistic herbicidal composition of present invention, but they should not be considered as a limitation to certain species.

Examples of weed species that can be applied with the synergistic herbicidal composition of present invention include monocotyledonous weeds, such as *Avena* spp., *Alopecurus* spp, *Apera* spp., *Brachiaria* spp., *Bromus* spp., *Digitaria* spp., *Lolium* spp., *Echinochloa* spp., *Leptochloa* spp., *Fimbristylis* spp., *Panicum* spp., *Phalaris* spp., *Poa* spp., *Setaria* spp.; and perennial variety include *Agropyron, Cynodon, Imperata* and *Sorghum Moench.*

As for dicotyledonous weeds, they include annual weed, such as *Abutilon* spp., *Amaranthus* spp., *Chenopodium* spp., *Chrysanthemum* spp., *Galium* spp., *Ipomoea* spp., *Kochia* spp., *Lamium* spp., *Matricaria* spp., *Pharbitis* spp., *Polygonum* spp., *Sida* spp., *Sinapis* spp., *Solanum* spp., *Stellaria* spp., *Veronica* spp., *Eclipta* spp., *Sesbania* spp., *Aeschynomene* spp. and *Viola* spp., *Xanthium* spp., and perennial variety, such as *Convolvulus, Cirsium, Rumex* and *Artemisia.*

Annual and perennial sedge weeds include *cyperus*, such as *Cyperus rotundus* L., *Cyperusesculentus* L., *Cyperus brevifolius* H., *Cyperus microiris* Steud, *Cyperus itria* L. and so on.

The herbicidal composition of present invention has a broad herbicidal spectrum and preferably controls the following weeds: monocotyledonous weeds, for example *Echinochloa* spp., *Panicum* spp., *Poa* spp., *Leptochloa* spp., *Brachiaria* spp., *Digitaria* spp., *Setaria* spp., *cyperus, Monochoria* spp., *Fimbristylis* spp., *Sagittaria* spp., *Eleocharis* spp., *Scirpus* spp., *Alisma* spp., *Aneilema* spp., *Blyxa* spp., *Eriocaulon* spp., *Potamogeton* spp., particularly the following varieties: *Echinochloa oryzicola, Monochoria vaginalis, Eleocharis acicularis, Eleocharis kuroguwai, Cyperus difformis, Cyperus serotinus, Sagittaria pygmaea, Alisma canaliculatum, Scirpus juncoides.* For dicotyledonous weeds, the herbicidal spectrum has expanded to following groups: *Polygonum* spp., *Rorippa* spp., *Rotala* spp., *Lindernia* spp., *Bidens* spp., *Sphenoclea* spp., *Dopatrium* spp., *Eclipta* spp., *Elatine* spp., *Gratiola* spp., *Lindernia* spp., *Ludwigia* spp., *Oenanthe* spp., *Ranunculus* spp., *Deinostema* spp., and so on. Particularly includes following varieties: *Rotala indica, Sphenoclea zeylanica, Lindernia procumbens, Ludwigia prostrate, Potamogeton distinctus, Elatine triandra, Oenanthe javanica* and so on.

The present invention also relates to the use of the synergistic herbicidal composition in controlling the growth of undesirable plants within useful crops.

The herbicidal composition of present invention is applicable for controlling/preventing the growth of undesirable plants in the useful crops (i.e., crops). Typically, the herbicidal composition of present invention is applicable to control/prevent the growth of undesirable plants in the following crops:

Food crops, such as:

Cereal (small-sized grains), such as *Triticum aestivum*, and wheat crops, such as *T. durum, T. monococcum, T. dicoccon* and *T. spelta, Secale cereale, Tritiosecale, Hordeum vulgare;*

*Zea mays;*

*Sorghum* (such as *Sorghum* bicolour);

Rice (*Oryza*, such as *Oryza sativa* and *Oryzaglaberrima*);

Sugarcane;

Beans (Legumes (Fabaceae)), such as *Glycine max*, peanuts (*Arachis hypogaea*) and bean crops, such as green pea (including *Pisum sativum*, pigeon pea and cowpea), kidney bean (including *Vicia faba, Vigna* and *Phaseolus*) and hyacinth bean (*lens culinaris* var.);

Cruciferae, includes canola (*Brassica napus*), *Brassica napus, B. oleracea* var., *B. juncea, B. campestris, B. narinosa, B. nigra* and *B. tournefortii;* and *Brassica rapa* var.;

Other broadleaf crops, such as sunflower, cotton, flax, flaxseed, sugar beet, potato and tomato;

TNV crops (TNV: tree, nuts and cane), such as grapes, citrus, pome, such as apple and pear, coffee, pistachio and oil palm, stone fruits, such as peach, almond, walnut, olive, cherry, plum and apricot;

Turf, pasture and meadow;

Onion and garlic;

Ornamental bulbous plant, such as tulip and narcissus;

Conifer and deciduous tree, such as pinus, fir, oak, maple, cornus, hawthorn, crabapple and rhamnus;

Ornamental plants for garden, such as *Petunia hybrida*, marigold, rose and snapdragons.

The synergistic herbicidal composition of present invention is particularly suitable for controlling/preventing the growth of undesirable plants among the useful crops, including wheat, barley, rye, triticale, durum wheat, rice, corn, sugarcane, *sorghum*, soybeans, peas, beans, lentils, peanuts, sunflower, sugar beet, potatoes, cotton, rapeseed, canola, mustard, cabbage, turnip, turf, grapes, apples, pears, stone fruit, peach, almond, walnut, olive, cherry, plum, apricot, citrus, coffee, pistachio, roses, petunias, marigolds, snapdragons, tulips, narcissus, fir, oak, maple, cornus, hawthorn and crabapple.

The synergistic herbicidal composition of present invention is most suitable for controlling/preventing the growth of undesirable plants among the useful crops, including wheat, barley, rye, triticale, durum wheat, rice, corn, sugarcane, *sorghum*, soybeans, peas, beans and lentils, peanut, sunflower, sugar beet, potatoes, cotton, rapeseed, canola, mustard, cabbage, turnip, turf, grapes, peaches, almonds, walnuts, olives, cherry, plum, apricot, citrus and pistachio.

The present invention also provides a use of the synergistic herbicidal composition to control the growth of undesirable plants among the useful crops and the aforesaid synergistic herbicidal composition is resistant by the aforesaid useful crops.

The synergistic herbicidal composition of present invention is also remarkably effective in control the growth of undesirable plants among non-crops areas, which includes road, railway, grassland, public pipeline and particularly undesirable plants growing in the areas covered with trees.

The synergistic herbicidal composition of present invention is also applicable to following crop plants: which is resistant to one or more herbicides due to the genetic engineering or breeding, which is resistant to one or more pathogens, such as plant pathogenic fungi due to the genetic engineering or breeding, or which is resistant to insects attack due to genetic engineering or breeding. The suitable example is the crops which are resistant to synthesized growth hormone, preferably are corn, wheat, sunflower, rice, canola, oil rape, soy bean, cotton and sugarcane, or the crops which are resistant to the attack of certain insects as a result of introduction genes to Bt toxin by gene modification.

The synergistic herbicidal composition of present invention can be applied through traditional skills known in the art. The suitable skills include spraying, atomizing, dusting, broadcast sawing or irrigation. The method of application can be determined by purpose; the skill should make sure the active components of present invention can achieve optimum distribution under any circumstances.

The present invention provides a method of controlling the growth of undesirable plants, comprising applying a herbicidal effective amount of synergistic herbicidal composition of present invention to the undesirable plants or their locus of growth (i) before germination of the undesirable plant (pre-emergence); (ii) after germination of the undesirable plant (post-emergence), or (iii) (i) and (ii).

If the active components contained in the synergistic herbicidal composition of present invention are applied on the surface of the soil before germination, then it can completely prevent the germination of weed seedling, or the weed will stop growing when it enters its cotyledon stage and then becomes dead two to four weeks thereafter.

If the aforesaid active components are applied to the green part of the plant after its germination, the growth of the weed will also stop immediately after the treatment, and the weed will remain in the stage when the herbicide is applied, or the weed is dead after a period of time. In this way, it can eliminate the competition from undesirable plants against useful crops earlier and sustainedly.

The present invention provides a method of controlling the growth of undesirable plants, comprising applying the active ingredients of synergistic herbicidal composition of present invention, namely Pyroxasulfone, Topramezone and Atrazine jointly or separately to the undesirable plants or their growing locus.

The aforesaid active compound may be applied to the undesirable plants (such as harmful plants, including monocotyledonous or dicotyledonous broadleaf weeds, gramineous weeds, sedge weeds or undesirable crop plants), seeds (such as caryopsis, seeds or vegetative propagation organ, including tuber or embryonic shoot) or growing locus (such as soil), preferably to apply at the green plants and parts of the plant, otherwise to apply to the soil if applicable.

The synergistic herbicidal composition of present invention comprises an effective amount of active components, namely Pyroxasulfone, Topramezone and Atrazine which has synergistic effects. The synergism can be observed when the active components Pyroxasulfone, Topramezone and Atrazine are applied jointly (for example used as combined formulation or tank mixture); the synergism can also be observed when the active compounds are applied at different time (separate application). The said herbicides or synergistic herbicidal composition can also be applied in portions (successive application), such as to apply at pre-emergence and then post-emergence, or it can also be applied after early emergence and then at medium or late stage of emergence. It is preferred to apply aforesaid active composition, namely Pyroxasulfone, Topramezone and Atrazine, jointly or almost simultaneously and particularly preferred to apply jointly. A possible use of present invention is to apply said active compounds jointly in the form a tank-mixture, wherein the concentrate of optimum formulated active compounds is mixed with water in the tank and then apply the obtained spray solution.

There is synergistic effect when active components, namely Pyroxasulfone, Topramezone and Atrazine are applied jointly, that is, the activity of said synergistic herbicidal composition is higher than the anticipated activity of the sum of each herbicide. Synergism is able to reduce the application rate, control weeds with wider spectrum, including broadleaf weeds, gramineous weeds and sedge weeds, take effects more quickly, has longer effective duration and can better control the undesired plants and expand the application period by only one or several times of application to the undesirable plants. The effective dose of all active components in the said synergistic herbicidal composition, namely Pyroxasulfone, Topramezone and Atrazine can be adjusted to a relatively low level that reduce its effect to the soil to optimum degree. This character has enabled the composition to be applied to sensitive crops, and prevent groundwater pollution. The synergistic herbicidal composition of present invention is able to reduce the application rate of active components significantly.

The present invention further provides a method of controlling the growth of undesirable plants, comprising applying the synergistic herbicidal composition of present invention in the presence of plants, seeds or other reproductive parts of useful crops.

If the active components cannot be well resisted by some crops, then the herbicidal composition can be applied by the means of directive spraying with spraying equipment, in order to prevent touching the sensitive crops when they reach the leaves of undesirable plants growing beneath the crops or exposed soil.

The present invention also provides a method that can prevent or reduce the harms to the plants, seeds or other reproductive parts of useful crops after treatment of Pyroxasulfone, including the application of the synergistic herbicidal composition of prevent invention to the plants, seeds or other reproductive parts of useful crops. The composition of active components, namely Pyroxasulfone, Topramezone and Atrazine of present invention, is able to improve compatibility of Pyroxasulfone with agricultural crops which increases the safety of crops.

The term "crop plant toxicity" refers to harms to crops, which is used to represent the safety of crops. Therefore, low plant toxicity to crops means higher level of safety to crops. The plant toxicity of the synergistic herbicidal composition of prevent invention is lower than the sum of plant toxicity when each of herbicidal component included in the composition is sprayed separately. As a result, the synergistic herbicidal composition of present invention is safer to crops than composition of individual herbicidal active components.

The application rate of Pyroxasulfone can vary in a broad range, such as within 0.1-1000 g/ha, preferred 5-500 g/ha or 10-300 g/ha. When the application rate is 0.1-1000 g/ha, Pyroxasulfone can control relatively wide spectrum of harmful plants when it is applied before sawing, at pre-planting or pre-emergence and post-emergence and the target plants include annual monocotyledonous or dicotyledonous broadleaf weeds, gramineous weeds and sedges, as well as any undesirable crop plants.

Topramezone has a relatively broad spectrum of controlling harmful plants and its application rate can vary in a wide range, such as within 1-500 g/ha, preferred 5-300 g/ha, more preferred 10-100 g/ha.

The application rate of active component Atrazine can vary in a wide range, such as within 1-4000 g/ha, preferred 10-3000 g/ha, more preferred 50-2000 g/ha.

Normally, the application rate of the synergistic herbicidal composition of prevent invention is low, for example within the range of 0.1-1000 g/ha, preferred 0.5-800 g/ha, particularly referred 1-500 g/ha.

FORMULATION EXAMPLES

Example 1: Suspension Concentrate of 6% Pyroxasulfone+6% Topramezone+30% Atrazine

| | |
|---|---|
| Pyroxasulfone | 6% |
| Topramezone | 6% |
| Atrazine | 30% |
| Atlas ® G5000(From Uniquema) | 5% |
| Agnique ® NSC 11NP(From Cognis) | 5% |
| Bentonite | 1% |
| Glycerol | 5% |
| Urea | 5% |
| Water | Balance to 100% |

Suspension concentrate of 6% Pyroxasulfone+6% Topramezone+30% Atrazine is prepared by well mixing the active components, dispersant, wetting agent and water according to proportions of the formula through grinding and/or high speed shearing.

Example 2: Wettable Powder of 2% Pyroxasulfone+10% Topramezone+20% Atrazine

| | |
|---|---|
| Pyroxasulfone | 2% |
| Topramezone | 10% |
| Atrazine | 20% |
| Polyoxyethylene glyceryl mono-fatty acid esters | 10% |
| Lauryl polyoxyethylene ether carboxylic acid sodium | 5% |
| Carbon white | 10% |
| Kaolin | Balance to100% |

Wettable powder of 2% Pyroxasulfone+10% Topramezone+20% Atrazine is prepared by mixing active components, various adjuvants and fillers according to proportions of the formula and then milling the obtained mixture with superfine mill machine.

Example 3: Wettable Powder of 8% Pyroxasulfone+4% Topramezone+40% Atrazine

| | |
|---|---|
| Pyroxasulfone | 8% |
| Topramezone | 4% |
| Atrazine | 40% |
| Fatty alcohol polyoxyethylene ether | 1% |
| Alkylphenol polyoxyethylene ether formaldehyde condensate | 2% |
| Carbon white | Balance to 100% |

Wettable powder of 8% Pyroxasulfone+4% Topramezone+40% Atrazine is prepared by mixing active components, various adjuvants and fillers according to proportions of the formula, and then milling the obtained mixture with superfine mill machine.

Example 4: Water-Dispersible Granule of 10% Pyroxasulfone+5% Topramezone+50% Atrazine

| | |
|---|---|
| Pyroxasulfone | 10% |
| Topramezone | 5% |
| Atrazine | 50% |
| Borresperse ® Na(From Borregaard Lignotech) | 4% |
| Urea | 5% |
| Kaolin | Balance to 100% |

Water-dispersible granule of 10% Pyroxasulfone+5% Topramezone+50% Atrazine is prepared by well mixing the active components, dispersant, wetting agent, disintegrating agent and filler according to proportions of the formula, and then milling the obtained mixture through jet milling, then adding some water to extrude paste which is dried and sieved in the end.

Example 5: Emulstifiable Concentrate of 2% Pyroxasulfone+2% Topramezone+10% Atrazine

| | |
|---|---|
| Pyroxasulfone | 2% |
| Topramezone | 2% |
| Atrazine | 10% |
| ethoxylated castor oil | 5% |
| Calcium dodecylbenzene sulfonate | 3% |
| SOLVESSO ™ 200 | Balance to 100% |

The above components are prepared according to the proportions and then well stirred to obtain homogeneous phase.

Example 6: Aqueous Suspo-Emulsion of 5% Pyroxasulfone+1% Topramezone+10% Atrazine

| | |
|---|---|
| Pyroxasulfone | 5% |
| Topramezone | 1% |
| Atrazine | 10% |
| Sodium methyl naphthalene sulfonate formaldehyde condensates | 5% |
| ethoxylated caster oil | 3% |
| bentonite | 1% |
| SOLVESSO™ 100 | 5% |
| Urea | 5% |
| Water | Balance to 100% |

Aqueous suspo-emulsion of 5% Pyroxasulfone+1% Topramezone+10% Atrazine is prepared by following steps: the suspension concentrate of Topramezone and Atrazine is obtained by grinding and/or high speed shearing of Topramezone, Atrazine, Sodium methyl naphthalene sulfonate formaldehyde condensates and water; the emulstifiable concentrate of Pyroxasulfone is obtained by well stirring the mixture of Pyroxasulfone, SOLVESSO™ 100 and ethoxylated caster oil; in the end, the emulstifiable concentrate of Pyroxasulfone is added to the suspension concentrate of Topramezone and Atrazine to obtain above aqueous suspo-emulsion.

Example 7: Wettable Powder of 10% Pyroxasulfone+30% Topramezone+50% Atrazine

| | |
|---|---|
| Pyroxasulfone | 10% |
| Topramezone | 30% |
| Atrazine | 50% |
| Alkylphenol polyoxyethylene ether phosphate | 2% |
| Nonylphenol polyoxyethylene ether | 2% |
| Carbon white | 3% |
| Kaolin | Balance to 100% |

The wettable powder is prepared by mixing the above components according to the proportions, and then grinding and crushing the obtained mixture.

Example 8: Water-Dispersible Granule of 5% Pyroxasulfone+10% Topramezone+50% Atrazine

| | |
|---|---|
| Pyroxasulfone | 5% |
| Topramezone | 10% |
| Atrazine | 50% |
| Sodium naphthalene sulfonate formaldehyde condensates | 5% |
| Sodium dodecyl sulfate | 5% |
| Urea | 5% |
| Kaolin | Balance to 100% |

Water-dispersible granule of 5% Pyroxasulfone+10% Topramezone+50% Atrazine is prepared by following steps: well-mix the active components, namely Pyroxasulfone, Topramezone and Atrazine, dispersant, wetting agent, disintegrating agent and filler according to proportions of the formula and then prepare the wettable powder by jet milling the obtained mixture; then add some water to extrude paste which is dried and sieved in the end.

Example 9: Oil-in-Water Emulsion of 1% Pyroxasulfone+5% Topramezone+10% Atrazine

| | |
|---|---|
| Pyroxasulfone | 1% |
| Topramezone | 5% |
| Atrazine | 10% |
| SOLVESSO™200 | 10% |
| Ethoxylated caster oil | 5% |
| SOPROPHOR® 4D384 (from RHODIA) | 1% |
| Water | Balance to 100% |

Dissolve the Pyroxasulfone, Topramezone and Atrazine into SOLVESSO™200 and add ethoxylated caster oil to obtain oil phase; well mix the SOPROPHOR® 4D384 and water according to formula to obtain aqueous phase; add the oil phase into the aqueous phase with stirring to obtain oil-in-water emulsion.

Example 10: Wettalbe Powder of 2.5% Pyroxasulfone+2.5% Topramezone+25% Atrazine

| | |
|---|---|
| Pyroxasulfone | 2.5% |
| Topramezone | 2.5% |
| Atrazine | 25% |
| Polyoxyethylene glyceryl mono-fatty acid esters | 5% |
| Polyoxyethylene lauryl ether carboxylic acid sodium | 5% |
| Highly dispersed silicon acid | 1% |
| Kaolin | Balance to 100% |

The wettable powder is prepared by mixing the above components according to the proportions and grinding, crushing the obtained mixture.

Example 11: Coated Granule of 5% Pyroxasulfone+5% Topramezone+30% Atrazine

| | |
|---|---|
| Pyroxasulfone | 5% |
| Topramezone | 5% |
| Atrazine | 30% |
| Polyethylene glycol | 3% |
| Culminal® MHPC100(From Hercules) | 6% |
| Calcium carbonate | Balance to 100% |

In the mixer, the carrier wetted by polyethylene glycol is evenly coated with grinded active components. The dust-free coated granules can be obtained through this manner.

Example 12: Wettable Powder of 3% Pyroxasulfone+2% Topramezone+50% Atrazine

| | |
|---|---|
| Pyroxasulfone | 3% |
| Topramezone | 2% |
| Atrazine | 50% |
| Borresperse® Na (From Borregaard Lignotech) | 3% |
| Mowiol® 18-88 (Kuraray) | 2% |
| Kaolin | Balance to 100% |

The wettable powder is prepared by mixing the above components according to the proportions and grinding, crushing the obtained mixture.

Example 13: Extruded Granule of 5% Pyroxasulfone+5% Topramezone+25% Atrazine

| | |
|---|---|
| Pyroxasulfone | 5% |
| Topramezone | 5% |
| Atrazine | 25% |
| p-methoxy fatty amide benzene sulfonate sodium | 4% |
| Carboxymethyl cellulose | 2% |
| Kaolin | Balance to 100% |

Mix and grind the active components and adjuvant, and use water to wet the mixture. Extrude the mixture which is dried in the air flow.

Example 14: Seed Coating Agent of 5% Pyroxasulfone+1% Topramezone+50% Atrazine

| | |
|---|---|
| Pyroxasulfone | 5% |
| Topramezone | 1% |
| Atrazine | 50% |
| Tween ® 20 (From Croda) | 10% |
| Lutensit ® A-B0 | 5% |
| Aluminum magnesium silicate | 1% |
| Bentonite | 1% |
| Glycerol | 5% |
| PVP-K30 | 1% |
| Water | Balance to 100% |

The seed coating agent is prepared by well-mixing above components according to the proportions and sand milling.

Example 15: A Mixed Formulation of Capsule Suspension and Suspension Concentrate (ZC) of 5% Pyroxasulfone+2% Topramezone+20% Atrazine

| | |
|---|---|
| Tersperse ® 2500 (From Huntsman) | 2% |
| Citric acid | 0.05% |
| DETA (From BASF SE) | 3.75% |
| Water | 13% |
| Topramezone | 2% |
| Lupranat ® M20 S (From BASF) | 9.5% |
| SOLVESSO ™ 100 | 5% |
| Emulsogen ®3510 (From Clariant) | 1.5% |
| Borresperse ® Na (From Borregaard Lignotech) | 1.3% |
| Silicone | 0.16% |
| Urea | 4% |
| Pyroxasulfone | 5% |
| Atrazine | 20% |
| Water | Balance to 100% |

Add the oil phrase consisting of Lupranat® M20 S, Pyroxasulfone and SOLVESSO™ 100 into aqueous solution containing Tersperse® 2500 to form emulsion. Then heat the obtained product and keep warm at 50° C. when add catalyst to react for 2 hrs. The microcapsules of pyroxasulfone are obtained after cooling.

Well-mix Tersperse® 2500, Emulsogen® 3510, Borresperse® Na, silicone, urea, Topramezone, Atrazine and water according to the proportions and sand milling the obtained mixture to prepare suspension.

Add the obtained microcapsules of pyroxasulone into the suspension of Topramezone+Atrazine, then well stir obtained product to prepare a mixed formulation of capsule suspension and suspension concentrate (ZC) of 5% Pyroxasulfone+2% Topramezone+20% Atrazine.

Example 16: Aqueous Suspo-Emulsion of 5% Pyroxasulfone+5% Topramezone+20% Atrazine

| | |
|---|---|
| Pyroxasulfone | 5% |
| Topramezone | 5% |
| Atrazine | 20% |
| SOLVESSO ™ 200 | 10% |
| Ethoxylated castor oil | 4% |
| Fatty alcohol polyoxyethylene ether sulfosuccinate monoester disodium | 5% |
| Modified lignosulphonate calcium | 5% |
| Xanthan gum | 1% |
| Attaflow ® FL (From BASF) | 1% |
| Glycerol | 5% |
| Water | Balance to 100% |

Dissolve Pyroxasulfone into SOLVESSO™ 200 and add ethoxylated castor oil to obtain Pyroxasulfone EC;

The suspension concentrate is prepared by well-mixing Topramezone, Atrazine, Fatty alcohol polyoxyethylene ether sulfosuccinate monoester disodium and modified lignosulphonate calcium according to the proportions and sand milling the obtained mixture.

The suspo-emulsion is prepared by adding the oil phase of pyroxasulfone into suspension concentrate comprising Topramezone and Atrazine.

Example 17: Emulstifiable Concentrate of 5% Pyroxasulfone+1% Topramezone+10% Atrazine

| | |
|---|---|
| Pyroxasulfone | 5% |
| Topramezone | 1% |
| Atrazine | 10% |
| Tween ® 20 (From Croda) | 5% |
| Lutensit ® A-B0 | 3% |
| SOLVESSO ™ 200 | Balance to 100% |

Mix the above components and well stir to obtain transparent homogeneous phase.

Example 19: 5% Pyroxasulfone+5% Topramezone+90% Atrazine

| | |
|---|---|
| Pyroxasulfone | 5% |
| Topramezone | 5% |
| Atrazine | 90% |

Well-mix the Pyroxasulfone, Topramezone and Atrazine according to the proportions.

Example 20: 3% Pyroxasulfone+3% Topramezone+60% Atrazine+34% Isoxadifen-ethyl

| | |
|---|---|
| Pyroxasulfone | 3% |
| Topramezone | 3% |
| Atrazine | 60% |
| Isoxadifen-ethyl | 34% |

Well-mix Pyroxasulfone, Topramezone, Atrazine and Isoxadifen-ethyl according to the proportions.

Example 21: 5% Pyroxasulfone+15% Topramezone+80% Atrazine

| | |
|---|---|
| Pyroxasulfone | 5% |
| Topramezone | 15% |
| Atrazine | 80% |

Well-mix Pyroxasulfone, Topramezone and Atrazine according to the proportions.

Example 22: 5% Pyroxasulfone+5% Topramezone+55% Atrazine+35% Fenclorim

| | |
|---|---|
| Pyroxasulfone | 5% |
| Topramezone | 5% |
| Atrazine | 55% |
| Fenclorim | 35% |

Well-mix Pyroxasulfone, Topramezone, Atrazine and Fenclorim according to the proportions.

Biology Test Example

The desired efficacy of the combination of three active compounds can be calculated through "Colby formula" as follows (S. R. Colby, "Calculating Synergistic and Antagonistic Responses of Herbicide Combinations, Weeds 1967, 15, 20-22): if A is the activity of active compound A when used in an amount of mg/ha or concentrate of mppm, expressed as a percentage of untreated control;

B is the activity of active compound B when used in an amount of ng/ha or concentrate of nppm, expressed as a percentage of untreated control;

C is the activity of active compound C when used in an amount of hg/ha or concentrate of hppm, expressed as a percentage of untreated control;

$E_0$ is the anticipated activity of active compounds A, B and C when used in an amount of m, n, h g/ha or concentrate of m, n, h ppm, $$E_0 = A \times B \times C / (100^{(N-1)})$$

N=3;

If the observed actual activity E is greater than the anticipated activity ($E_0$), then the composition has synergistic effect.

If the observed actual efficiency of weed control (E) through the biology test is greater than the anticipated value ($E_0$) as calculated via Colby's equation, then it represents that the efficacy of herbicidal composition is greater than the sum of efficacy of each component, which means the composition has synergistic effect.

Pre-Emergence Test:

Under greenhouse, place the seeds or the root tubers of monocotyledonous weeds and dicotyledonous weeds in a pot containing sandy clay and cover it with soil. Use standard soil as growing media. At pre-emergence stage, apply the herbicides separately or in the form of mixture on the surface of the soil. After the treatment, put the pot in greenhouse and keep it under the condition suitable for the growth of weeds. By comparing with untreated control group, conduct the visual assessment on the plant damage after 3 to 4 weeks of test circle or on the plant damage after emergence. As shown in the test results, the application of synergistic herbicidal composition of present invention has excellent herbicidal activity to wide-spectrum of weeds at pre-emergence stage. The observation data from the test has indicated that the activity of synergistic herbicidal composition of present invention has exceeded the anticipated value as calculated through Colby formula when applied at a suitable low-level of application rate, presenting significant synergistic effect.

Post-Emergence Test:

Use stem and leaf treatment for potted grown plant(NY/T 1155.4-2006): fill a plastic pot (6 cm height, 9 cm diameter) with a quantity of soil and sow 15 to 20 seeds of monocotyledonous weeds and dicotyledonous weeds in the plastic pot, cover it with 0.5 to 1 cm thick of fine soil and then put it in greenhouse for cultivation. When weeds grow to the 2 to 4 leave stage, conduct the stem and leaf spray treatment with 1 mL herbicidal solution on each pot and repeat four times for each treatment and leave some pots untreated as control group. Keep the treated pots in a greenhouse for cultivation and observe the growing status of target weeds periodically. Conduct the visual test on the target weeds regarding the damage symptoms and growth inhibition effect after 21 days. Weigh up the fresh weight above the ground or plant fresh weight and evaluate the toxicity of the herbicidal formulation on target weeds based on the fresh weight inhibition rate of the target.

Prepare the following formulations according to specific weight percentages: 1. Pyroxasulfone; 2. Topramezone; 3 Atrazine; 4. Pyroxasulfone+Topramezone; 5. Pyroxasulfone+Atrazine; 6. Topramezone+Atrazine; 7. Pyroxasulfone+Topramezone+Atrazine. After that, dilute above formulations with water to obtain diluted formulations.

Investigation Method:

Conduct visual assessment the damage symptom and growth inhibition status of target weeds after 21 days. Weigh up the fresh weight above the ground and calculate the inhibition rate of fresh weight (%).

$$\text{Fresh Weight Inhibition Rate } P(\%) = \frac{\text{Fresh weight of control group} - \text{Fresh weight of treated group}}{\text{Fresh weight of control group}} \times 100$$

Anticipated effects of the special combined three active components can be calculated through so called "Colby formula". If the actual efficiency of weed control observed during the biology test exceeds the anticipated value (E) calculated by Colby's formula, then it represents that the efficacy of herbicidal composition is greater than the sum of efficacy of each component, which means the composition has synergistic effect.

The synergistic herbicidal composition of present invention has conducted test on the following important harmful plants (gramineous weeds, broadleaf weeds, sedge weeds) with wide herbicidal spectrum: *Echinochloa oryzicola, Digitaria* spp., *Stellaria media, Amaranthus retroflexus, Fallopia* (ex *Polygonum*) *Convolvulus, Abuthilon theophrasti, Sagittariatrifolia*, Oriental Waterplantain Rhizome, Herb of Pygmy Arrowhead, *Monochoria korsakowii, Lindernia procumbens, Solanum nigrum L., Scirpus juncoides Roxb, Cyperus difformis L., Chenopodium alum L., Avena fatua L.* and *Galium aparine L.* var. *tenerum Gren. et (Godr.) Rebb.*

TABLE 1

The weed control efficacy of Pyroxasulfone, Topramezone, Atrazine, Pyroxasulfone + Topramezone, Pyroxasulfone + Atrazine, Topramezone + Atrazine and Pyroxasulfone + Topramezone + Atrazine:

| Formulation | No. | Application rate g/ha | Actual survival rate (%) | Survival rate in theory (%) |
|---|---|---|---|---|
| Pyroxasulfone | 1 | 1 | 89 | — |
|  | 2 | 5 | 78 | — |
|  | 3 | 10 | 60 | — |
| Topramezone | 1 | 1 | 87.8 | — |
|  | 2 | 25 | 24.5 | — |
|  | 3 | 50 | 12.8 | — |
| Atrazine | 1 | 1 | 100 | — |
|  | 2 | 50 | 100 | — |
|  | 3 | 100 | 67 | — |
| Topramezone + Atrazine | 1 | 1 + 1 | 81.2 | — |
|  | 2 | 25 + 1 | 21.2 | — |
|  | 3 | 50 + 1 | 10.1 | — |
|  | 4 | 1 + 50 | 78.3 | — |
|  | 5 | 1 + 100 | 51.1 | — |
|  | 6 | 25 + 50 | 18.8 | — |
|  | 7 | 25 + 100 | 10.2 | — |
|  | 8 | 50 + 50 | 9.7 | — |
|  | 9 | 50 + 100 | 6.7 | — |
| Pyroxasulfone + Topramezone | 1 | 1 + 1 | 68.3 | — |
|  | 2 | 1 + 25 | 16.3 | — |
|  | 3 | 1 + 50 | 7.9 | — |
|  | 4 | 5 + 1 | 61.4 | — |
|  | 5 | 5 + 25 | 11.4 | — |
|  | 6 | 5 + 50 | 5.8 | — |
|  | 7 | 10 + 1 | 45.2 | — |
|  | 8 | 10 + 25 | 5.9 | — |
|  | 9 | 10 + 50 | 3.8 | — |
| Pyroxasulfone + Atrazine | 1 | 1 + 1 | 83 | — |
|  | 2 | 1 + 50 | 84 | — |
|  | 3 | 1 + 100 | 53.4 | — |
|  | 4 | 5 + 1 | 69 | — |
|  | 5 | 5 + 50 | 62 | — |
|  | 6 | 5 + 100 | 34.1 | — |
|  | 7 | 10 + 1 | 53 | — |
|  | 8 | 10 + 50 | 50 | — |
|  | 9 | 10 + 100 | 25 | — |
| Pyroxasulfone + Topramezone + Atrazine | 1 | 1 + 1 + 1 | 63.1 | 78.2 |
|  | 2 | 1 + 25 + 1 | 11.4 | 21.8 |
|  | 3 | 1 + 50 + 1 | 4.3 | 11.3 |
|  | 4 | 1 + 1 + 50 | 65.7 | 78.1 |
|  | 5 | 1 + 1 + 100 | 39.2 | 52.3 |
|  | 6 | 1 + 25 + 50 | 11.8 | 21.8 |
|  | 7 | 1 + 25 + 100 | 7.1 | 14.6 |
|  | 8 | 1 + 50 + 50 | 5.7 | 11.4 |
|  | 9 | 1 + 50 + 100 | 0 | 7.6 |
|  | 10 | 5 + 1 + 1 | 55.3 | 68.5 |
|  | 11 | 5 + 25 + 1 | 6.8 | 19.11 |
|  | 12 | 5 + 50 + 1 | 0 | 9.9 |
|  | 13 | 5 + 1 + 50 | 51.3 | 68.4 |
|  | 14 | 5 + 1 + 100 | 24.3 | 45.8 |
|  | 15 | 5 + 25 + 50 | 0 | 19.1 |
|  | 16 | 5 + 25 + 100 | 0 | 12.8 |
|  | 17 | 5 + 50 + 50 | 0 | 9.9 |
|  | 18 | 5 + 50 + 100 | 0 | 6.68 |
|  | 19 | 10 + 1 + 1 | 34.8 | 52.68 |
|  | 20 | 10 + 25 + 1 | 0 | 14.7 |
|  | 21 | 10 + 50 + 1 | 0 | 7.68 |
|  | 22 | 10 + 1 + 50 | 36.7 | 52.68 |
|  | 23 | 10 + 1 + 100 | 16.5 | 35.29 |
|  | 24 | 10 + 25 + 50 | 0 | 14.7 |
|  | 25 | 10 + 25 + 100 | 0 | 9.84 |
|  | 26 | 10 + 50 + 50 | 0 | 7.68 |
|  | 27 | 10 + 50 + 100 | 0 | 5.14 |

The test result shows that when applying the composition of Pyroxasulfone, Topramezone and Atrazine with the range of 1 to 10:1 to 10:1 to 100, it represents obvious synergistic effect in controlling gramineous weeds, broadleaf weeds and sedge weeds.

In conclusion, weed control efficacy of the synergistic herbicidal composition of present invention is superior to the efficacy of each component being applied separately. The pesticide effect test has demonstrated that the composition has synergistic effect and has the characteristics of expanded herbicidal spectrum, controlling gramineous weeds, broadleaf weeds and sedge weeds in the field by a single application, reducing times of application, decreasing control cost, delaying the occurrence of weed resistance, safe to crops and consistent with safety requirements for pesticides. It is applicable to corn, soybean, cereal, sunflower, potato, peanut, cotton with fief weeding at pre-emergence or weeding at post-emergence.

Safety Effect:

Under greenhouse, sow the seeds of wheat for testing in a plastic tank till they grow to 4 leaf stage. During the stage, apply the Pyroxasulfone, Topramezone+Atrazine and the composition of Pyroxasulfone+Topramezone+Atrazine on the testing plants. Evaluate the phytotoxicity of the herbicides against crops measured by percentage. 100% represents the testing plants completely die, while 0% represents no phytotoxicity exist.

TABLE 2

Toxicity test of Pyroxasulfone, Topramezone + Atrazine, Pyroxasulfone + Topramezone + Atrazine to plants:

| Formulation | No. | Application rate g/ha | Phytotoxicity (%) |
|---|---|---|---|
| Pyroxasulfone | 1 | 1 | 0 |
|  | 2 | 5 | 0 |
|  | 3 | 10 | 11 |
| Topramezone + Atrazine | 1 | 1 + 1 | 0 |
|  | 2 | 25 + 1 | 0 |
|  | 3 | 50 + 1 | 0 |
|  | 4 | 1 + 50 | 0 |
|  | 5 | 1 + 100 | 0 |
|  | 6 | 25 + 50 | 0 |
|  | 7 | 25 + 100 | 0 |
|  | 8 | 50 + 50 | 0 |
|  | 9 | 50 + 100 | 0 |
| Pyroxasulfone + Topramezone + Atrazine | 1 | 1 + 1 + 1 | 0 |
|  | 2 | 1 + 25 + 1 | 0 |
|  | 3 | 1 + 50 + 1 | 0 |
|  | 4 | 1 + 1 + 50 | 0 |
|  | 5 | 1 + 1 + 100 | 0 |
|  | 6 | 1 + 25 + 50 | 0 |
|  | 7 | 1 + 25 + 100 | 0 |
|  | 8 | 1 + 50 + 50 | 0 |
|  | 9 | 1 + 50 + 100 | 0 |
|  | 10 | 5 + 1 + 1 | 0 |
|  | 11 | 5 + 25 + 1 | 0 |
|  | 12 | 5 + 50 + 1 | 0 |
|  | 13 | 5 + 1 + 50 | 0 |
|  | 14 | 5 + 1 + 100 | 0 |
|  | 15 | 5 + 25 + 50 | 0 |
|  | 16 | 5 + 25 + 100 | 0 |
|  | 17 | 5 + 50 + 50 | 0 |
|  | 18 | 5 + 50 + 100 | 0 |
|  | 19 | 10 + 1 + 1 | 0 |
|  | 20 | 10 + 25 + 1 | 0 |
|  | 21 | 10 + 50 + 1 | 0 |
|  | 22 | 10 + 1 + 50 | 0 |
|  | 23 | 10 + 1 + 100 | 0 |
|  | 24 | 10 + 25 + 50 | 0 |
|  | 25 | 10 + 25 + 100 | 0 |
|  | 26 | 10 + 50 + 50 | 0 |
|  | 27 | 10 + 50 + 100 | 0 |

It can be observed that the phytotoxicity to crops of the synergistic herbicidal composition of present invention is lower than the sum of phytotoxicity to crops of each herbicidal compound in the composition applied separately.

Therefore, the composition of present invention is safer to crops than the composition comprising one single herbicidal active component. The combination of Topramezone with Atrazine has improved the compatibility of Pyroxasulfone to crops and reduced or prevented harms to the plants, seeds or other reproductive parts of useful crops which have been treated by Pyroxasulfone.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A herbicidal composition comprising a synergistically effective amount of Pyroxasulfone, Topramezone and Atrazine as active components, wherein the weight ratio of Pyroxasulfone, Topramezone and Atrazine ranges from 1 to 2:5 to 10:1 to 20.

2. The herbicidal composition of claim 1, further comprising a surfactant and/or filler.

3. The herbicidal composition of claim 2, wherein said active components of Pyroxasulfone, Topramezone and Atrazine are present in the herbicidal composition in an amount of 5% to 90% by weight based on the total weight of the composition.

4. The herbicidal composition of claim 2, wherein said active components of Pyroxasulfone, Topramezone and Atrazine are present in the herbicidal composition in an amount of 10% to 80% by weight based on the total weight of the composition.

5. The herbicidal composition of claim 2, wherein said active components of Pyroxasulfone, Topramezone and Atrazine are present in the herbicidal composition in an amount of 20% to 60% by weight based on the total weight of the composition.

6. The herbicidal composition of claim 1, wherein the composition is provided as a formulation selected from a wettable powder (WP), an emulsifiable concentrate (EC), a suspension concentrate (SC), a capsule suspension (CS), a micro-emulsion (ME), an oil-in-water emulsion (EW), suspoemulsion (SE), water dispersible granules (WDG), an aqueous solution (AS), a mixed formulation of capsule suspension and suspension concentrate (ZC) and an ultra-low volume liquid (ULV).

7. The herbicidal composition of claim 1, wherein the active components present in the composition consist of Pyroxasulfone, Topramezone and Atrazine.

8. A method of controlling the growth of undesirable plants, comprising applying the herbicidal composition of claim 1 to the undesirable plants or their growing locus (i) before germination of the undesirable plant (pre-emergence); (ii) after germination of the undesirable plant (post-emergence), or (iii) (i) and (ii).

9. A method of controlling the growth of undesirable plants, comprising applying the active components Pyroxasulfone, Topramezone and Atrazine of the herbicidal composition of claim 1 to the undesirable plants or their growing locus jointly or separately.

10. A method of controlling the growth of undesirable plants, comprising applying the herbicidal composition of claim 1 in the presence of the plants, seeds or other reproductive parts of useful crops.

11. A method of reducing or preventing harm caused by Pyroxasulfone when applied to plants, seeds or other reproductive parts of useful crops, comprising applying Pyroxasulfone in the herbicidal composition according to claim 1 on the plants, seeds or other reproductive parts of the useful crops.

12. The method of controlling the growth of undesirable plants of claim 8, wherein the undesirable plants are selected from broadleaf weeds, sedge weeds and gramineous weeds.

* * * * *